United States Patent [19]

Kinsey, Jr. et al.

[11] Patent Number: 5,002,833
[45] Date of Patent: Mar. 26, 1991

[54] GREASE RESISTANT DUAL OVENABLE PAPERBOARD BASED STRUCTURE WITH FOOD CONTACT RESIN LAYER

[75] Inventors: Joe L. Kinsey, Jr., Irvington; Charles E. Gibbons; James M. Kittrell, both of Mobile, all of Ala.

[73] Assignee: International Paper Company, Purchase, N.Y.

[21] Appl. No.: 504,170

[22] Filed: Apr. 4, 1990

[51] Int. Cl.$^5$ .................... B32B 27/08; B65D 5/56
[52] U.S. Cl. ................... 428/475.8; 428/476.1; 428/479.6; 428/481; 428/513; 428/34.2; 428/36.7; 428/516; 264/176.1; 426/127; 426/113; 229/3.5 R
[58] Field of Search ............. 428/481, 479.6, 513, 428/516, 475.8, 476.1

[56] References Cited

U.S. PATENT DOCUMENTS

| | | | |
|---|---|---|---|
| Re. 32,270 | 10/1986 | Murray, Jr. | 428/481 |
| 3,924,013 | 12/1975 | Kane | 428/481 |
| 4,386,991 | 6/1983 | Shiomi et al. | 428/420 |
| 4,543,280 | 9/1985 | Fujita et al. | 428/514 |
| 4,929,476 | 5/1990 | Gibbons et al. | 428/516 |
| 4,935,282 | 6/1990 | Pawlowaki et al. | 428/137 |
| 4,940,612 | 7/1990 | Gibbons et al. | 428/349 |

Primary Examiner—P. C. Sluby
Attorney, Agent, or Firm—Stewart L. Gitler; Walt Thomas Zielinski

[57] ABSTRACT

A dual ovenable paperboard based structure which contains a food contact resin layer. The resin layer in direct contact with the ovenable food product exhibits superior food release properties, grease and oil resistance, and resistance to warpage even after extended periods of time following oven heating. The unique laminate is formed via coextrusion coating techniques on conventional coextrusion equipment at conventional temperatures. The resulting product has a high degree of adhesion between the paperboard and the polymethylpentene food contact layer, and is capable of being utilized for forming pressed or locked corner food trays which can be subjected to oven cooking temperatures.

4 Claims, 1 Drawing Sheet

GREASE RESISTANT DUAL OVENABLE PAPERBOARD BASED STRUCTURE WITH FOOD CONTACT RESIN LAYER

BACKGROUND OF THE INVENTION

1. Field of the Invention

This invention pertains generally to the field of oven heatable plastic coated paperboard containers and to processes for producing the same.

2. Description of the Prior Art

The most common type of container used for convenience foods which are to be heated within the container are formed of a thin sheet aluminum, or layers, which include aluminum foil. These containers are costly and cannot be used in microwave oven cooking. As a result substantial efforts have been made to produce, and provide, plastic coated paperboard cartons or containers which can withstand oven heating and can be used for microwave oven heating.

Polyethylene is the most often used coating material for paperboard since it has good moisture impermeability and is easily adhered to many types of paperboard. Additionally, polyethylene is relatively low in cost. However, polyethylene and many other types of common plastic coating materials do not have sufficient resistance to melting at high temperatures required for conventional oven heating. Coating polymers which withstand conventional oven heating must also have adequate structural strength and abrasion resistance, as well as being FDA approved for product contact.

Polyethylene terephthalate (PET) and polybutylene terephthalate (PBT) are particularly satisfactory coating materials for oven heatable trays. They both exhibit, or possess, high melting temperatures and good structural strength, and are compatible with, and unaffected by, most food products. PET coated paperboard trays, and, to a lesser extent, PBT coated paperboard trays are subject to warpage after heating due to postheating crystallization and shrinkage of the resins. These trays may be unsuitable for certain applications where the tray receives heat prior to final consumer use (e.g., when the packaged food is partially baked in the paper tray prior to distribution to the consumer). It is extremely difficult to obtain good bonding of polyethylene terephthalate or polybutylene terephthalate to other materials and particularly paperboard. Bonding has been accomplished by utilization of adhesives or primers, applied over the paperboard before a hot melt extrusion of the polymer is applied to the paperboard. Concerns have arisen regarding the use of adhesives or primers, due to their possible migration into the contents of the food package.

As a result of the difficulty of bonding polyethylene terephthalate or polybutylene terephthalate to board, procedures or methods to overcome this problem were brought forth.

A procedure for extrusion coating polyethylene terephthalate onto paperboard without the use of primers is shown in U.S. Pat. No. 3,924,013 to Kane. Kane discloses a preheating of the paperboard prior to it being contacted with the hot melt extrusion. Such a process is inadequate for the purposes of a pressed board which is formed into trays. Since preheating the board reduces its moisture content, the board becomes brittle and tears occur during pressing formation. Deep pressed heatable containers or locking corner folded trays are preferred since they do not require the use of adhesives or heat seals to form the edge walls of the tray. Trays formed by adhesively connecting the sides of the tray together are subject to separation at the very high temperatures of oven heating and the adhesive material may migrate into the food product. Pressing allows formation of smooth radius contoured corners, which provides good heat distribution characteristics during oven heating.

A second attempt to overcome the poor adhesion of polyethylene terephthalate is shown in U.S. Reissue Pat. No. 32,270 to Murray, Jr. This document discusses corona discharge treatment of the paperboard prior to the contact with the hot extrudate of polyethylene terephthalate. The melt curtain is extrusion coated at temperatures between 580° F. and 640° F., whereby the temperature of the extrudate, when the web is contacted, is above 480° F. and the temperature to which it is cooled is about 170° F.

It is an object of the present invention to produce a paperboard laminate which can be used in both a conventional oven and a microwave oven. It is a further object of the present invention to produce a dual ovenable container which has good grease and oil resistance and superior food release properties.

It is a further object of the present invention to produce a dual ovenable container from a paperboard laminate which has a novel laminate structure with a food contact layer having food release properties superior to that of polyethylene terephthalate polyester, or polybutylene terephthalate.

It is a further objective of the present invention to produce a dual ovenable packaging structure which resists warpage even after heating.

SUMMARY OF THE INVENTION

The dual ovenable base stock paperboard structure formed in accordance with the present invention is especially suited for bakery applications where postcooking warpage occurs and food release is generally poor. The laminate base stock structure utilizes a novel food contact layer of polymethylpentene resin which does not warp even after long periods following heating and exhibits superior food release properties. The polymethylpentene polymer resin coating is applied to a paperboard substrate via a coextrusion incorporating unique tie resins, and buried oil and grease barrier resin layers.

The paperboard substrate is selected to have good resistance to conventional and microwave oven heating; and low levels of contaminants which inhibit adhesion of the coextruded layer.

The coextrusion laminate is directly applied to the paperboard substrate via conventional coextrusion techniques at conventional coextrusion coating temperatures. The polymethylpentene layer is extruded as part of a three layer or five layer coextrusion with a buried barrier layer which enhances the oil and grease resistance of the coating. Binding the oil and grease barrier layer to the polymethylpentene resin layer is a polymethylpentene based tie resin.

Further objects, features, and advantages of the invention will be apparent from the following detailed description taken in conjunction with the accompanying drawings.

DETAILED DESCRIPTION OF THE INVENTION

Figure 1:
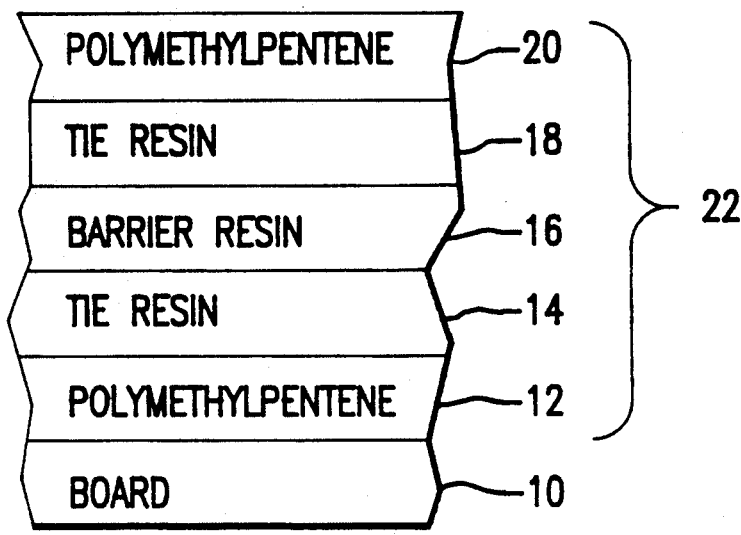
FIG. 1 is a cross-sectional elevational view of a laminate embodying the present invention.
Figure 3:
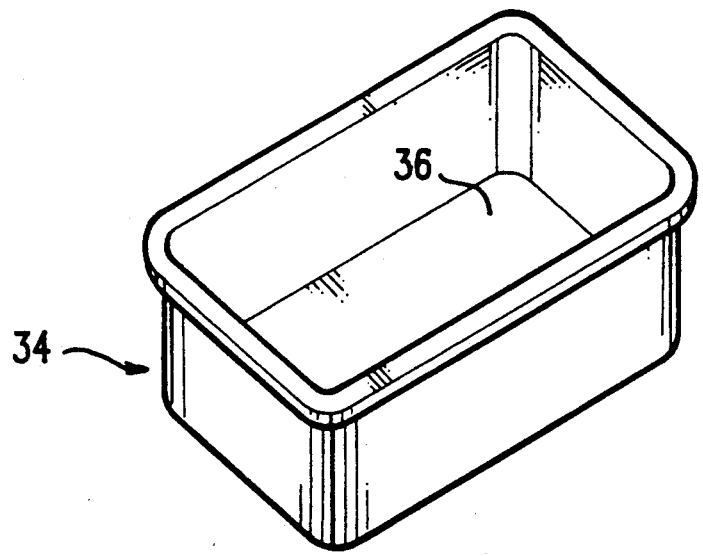
FIG. 3 is an external perspective view of the pressed tray formed form the coated paperboard of the invention.

Referring now more particularly to the drawings, a preferred embodiment of a laminate embodying the present invention is shown generally in FIG. 1. The laminate shown in FIG. 1 is especially adapted to use in forming press formed one piece trays or locking corner folding trays. Such pressed trays are formed by placing a blank of the laminate with the coated side up over a female die and pressing downwardly thereon with a mating head of a male die. An example of such a tray construction is shown in FIG. 3, wherein the finished tray 34 includes a depressed bottom panel 36 for receiving the food product.

FIG. 1 discloses a paperboard based laminate structure having as a substrate a layer of paperboard 10 and a five layer coating 22 coextruded thereon.

The coextruded layer 22 is made up of a layer of polymethylpentene 12 which is in direct contact with the board 10, and a tie layer 14 which binds the oil and grease barrier layer 16 to the polymethylpentene layer 12. Placed between the oil and grease barrier layer 16 and the food contact layer of polymethylpentene 20 is a second tie layer 18. The entire structure 22 makes up a five layer coextrusion.

The polymethylpentene exhibits superior food release properties even after reheating for extended time periods. Additionally, the use of polymethylpentene imparts warpage resistant properties to the board.

Any suitable coextrudable oil and grease barrier resin can be selected for the present invention such as polyamide resins, copolyamide resins such as the nylon resins, polyester resins or copolyester resins.

Additionally, the tie resin suitable for the present invention is chemically modified graft copolymers of methylpentene.

Figure 2:
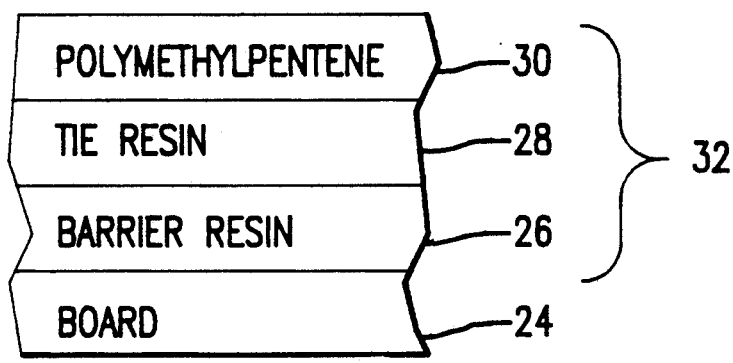
FIG. 2 is a cross-sectional elevational view of a laminate embodying an alternate embodiment of the present invention.

FIG. 2 shows an alternate embodiment of the present invention. Disclosed therein is a paperboard laminate structure having as a substrate a layer of paperboard 24.

Coextrusion coated onto the substrate 24 is a three layer sandwich containing an oil and grease barrier layer 26 next to the substrate; an adhesive tie resin layer 28 and a layer of polymethylpentene 30 which acts as the food contact layer. The entire structure 32 makes up a three layer coextrusion.

Relative proportions of each layer may be adjusted to improve adhesion and or economics as desired. The oil and grease barrier layer may be any highly temperature-resistant oil and grease resistant polar polymer such as nylon or polyester.

A preferred polymethylpentene polymer resin is TPX manufactured by Mitsui Petrochemical Corporation.

We claim:

1. An ovenable paperboard laminate comprising:
   (a) paperboard substrate; and
   (b) a three layer sandwich coextrusion coated onto said substrate comprising:
      (i) a non-metallic polymeric oil and grease barrier resin layer in direct contact with said substrate;
      (ii) a chemically modified graft copolymer of polymethylpentene tie layer in contact with said barrier resin layer; and
      (iii) a polymethylpentene resin layer contacting said tie layer, wherein said polymethylpentene layer is in direct contact with ovenable food products and said layer exhibits superior food properties.

2. An ovenable paperboard laminate as claimed in claim 1, wherein said oil and grease barrier resin layer is polyamide resin, copolyamide resin, polyester resin, or copolyester resin.

3. An ovenable paperboard laminate comprising:
   (a) a paperboard substrate; and
   (b) a five layer sandwich coextrusion coated onto said substrate comprising:
      (i) a first layer of polymethylpentene resin in direct contact with said substrate;
      (ii) a first layer of a chemically modified graft copolymer of polymethylpentene tie material in contact with said first polymethylpentene resin layer;
      (iii) a non-metallic polymeric oil and grease barrier resin layer in direct contact with said first tie layer;
      (iv) a second layer of a chemically modified graft copolymer of polymethylpentene tie material in contact with said oil and grease barrier resin layer; and
      (v) a second layer of polymethylpentene contacting said second tie layer wherein said second layer of polymethylpentene is in direct contact with ovenable food products and said layer exhibits excellent food release properties.

4. An ovenable paperboard laminate as claimed in claim 3, wherein said oil and grease barrier resin layer is a polyamide resin, copolyamide resin, polyester resin, or copolyester resin.

* * * * *